United States Patent
Ramamurthy et al.

(10) Patent No.: US 9,084,144 B2
(45) Date of Patent: Jul. 14, 2015

(54) POWER SAVING FEATURES IN A COMMUNICATION DEVICE

(75) Inventors: Harish Ramamurthy, Sunnyvale, CA (US); Sandesh Goel, Noida (IN); Raja Banerjea, Sunnyvale, CA (US); Ashish Kumar Shukla, Yerwada (IN)

(73) Assignee: Marvell World Trade Ltd., St. Michael (BB)

( * ) Notice: Subject to any disclaimer, the term of this patent is extended or adjusted under 35 U.S.C. 154(b) by 680 days.

(21) Appl. No.: 13/016,603

(22) Filed: Jan. 28, 2011

(65) Prior Publication Data

US 2011/0188424 A1 Aug. 4, 2011

Related U.S. Application Data

(60) Provisional application No. 61/300,737, filed on Feb. 2, 2010.

(51) Int. Cl.
| | |
|---|---|
| G08C 17/00 | (2006.01) |
| H04L 12/50 | (2006.01) |
| H04W 28/06 | (2009.01) |
| H04W 52/02 | (2009.01) |
| H04W 74/04 | (2009.01) |

(52) U.S. Cl.
CPC ........ H04W 28/065 (2013.01); H04W 52/0216 (2013.01); H04W 74/04 (2013.01); Y02B 60/50 (2013.01)

(58) Field of Classification Search
USPC ........................................................ 370/311
See application file for complete search history.

(56) References Cited

U.S. PATENT DOCUMENTS

| 7,796,545 B2* | 9/2010 | Surineni et al. ............... 370/278 |
|---|---|---|
| 2006/0078001 A1* | 4/2006 | Chandra et al. ............... 370/473 |
| 2006/0187964 A1 | 8/2006 | Li et al. |
| 2007/0104162 A1* | 5/2007 | Kneckt et al. ................. 370/338 |
| 2007/0153757 A1* | 7/2007 | Kim et al. ...................... 370/338 |
| 2007/0191052 A1* | 8/2007 | Kneckt et al. ................. 455/522 |
| 2010/0074119 A1* | 3/2010 | Krishnaswamy ............. 370/242 |
| 2010/0189056 A1* | 7/2010 | Nishibayashi et al. ....... 370/329 |
| 2011/0149927 A1* | 6/2011 | Stacey et al. .................. 370/338 |

FOREIGN PATENT DOCUMENTS

| JP | 2009-512386 A | 3/2009 |
|---|---|---|
| JP | 2009-540632 A | 11/2009 |
| WO | WO-2005/112355 A1 | 11/2005 |
| WO | WO-2007/046619 A1 | 4/2007 |
| WO | WO-2007/143352 A1 | 12/2007 |

OTHER PUBLICATIONS

International Preliminary Report on Patentability for PCT/US2011/023066, mailed Aug. 7, 2012.

(Continued)

*Primary Examiner* — Shaq Taha

(57) ABSTRACT

A method in a communication network includes receiving a data unit that includes a request to transmit an aggregate data unit to a communication device, and, in response to receiving the data unit, generating an aggregate data unit for transmission to the communication device, where the aggregate data unit includes a plurality of component data units, each having a respective media access channel (MAC) header, and a duration of the aggregate data unit is determined using a parameter negotiated with the communication device.

32 Claims, 11 Drawing Sheets

(56) References Cited

OTHER PUBLICATIONS

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

Gunnam, et al., "Multi-Rate Layered Decoder Architecture for Block LDPC Codes of the IEEE 802.11 n Wireless Standard," IEEE International Symposium on Circuits and Systems, 2007 (ISCAS 2007), pp. 1645-1648 (2007).

S. A. Mujtaba, "IEEE P802.11—Wireless LANs, TGn Sync Proposal Technical Specification," *The Institute of Electrical and Electronics Engineers, Inc.*, doc.: IEEE 802.11—04/0889r6, May 2005.

IEEE Std 802.11b-1999/Cor 1-2001 (Corrigendum to IEEE Std 802. 11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

"WMM™ Power Save for Mobile and Portable Wi-Fi Certified Devices," Wi-Fi Alliance, 16 pages, Dec. 2005.

IEEE Std 802.11e/D13.0, "IEEE Standard for Information technology—Telecommunications and information exchange between systems—Local and metropolitan area networks—Specific requirements, Part 11: Wireless LAN Medium Access Control (MAC) and Physical Layer (PHY) Specifications: Amendment : Medium Access Control (MAC) Quality of Service (QoS) Enhancements," *The Institute of Electrical and Electronics Engineers, Inc.*, Jan. 2005.

International Search Report and Written Opinion for PCT/US2011/023066, mailed Nov. 4, 2011.

IEEE Std 802.11b-1999/Cor 1-2001; IEEE Standard for Information technology—Telecommunications and information exchange between systems—Local and metropolitan area networks—Specific requirements—Part 11: Wireless LAN Medium Access Control (MAC) and Physical Layer (PHY) specifications—Amendment 2: Higher-speed Physical Layer (PHY) extension in the 2.4 GHz band—Corrigendum 1; 2001; pp. 1-15; Institute of Electrical and Electronics Engineers, Inc.

IEEE P802.11g/D8.2; DRAFT Supplement to STANDARD [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; 2003; pp. 1-69; Institute of Electrical and Electronics Engineers, Inc.

IEEE 802.11-04/0889r6; Syed Aon Mujtaba; "TGn Sync Proposal Technical Specification"; May 2005; pp. 1-131; Institute of Electrical and Electronics Engineers, Inc.

Kiran Gunnam, Gwan Choi, Weihuang Wang, Mark Yeary; Multi-Rate Layered Decoder Architecture for Block LDPC Codes of the IEEE 802.11n Wireless Standard; 2007; pp. 1645-1648; Institute of Electrical and Electronics Engineers, Inc.

IEEE Std 802.11a-1999; Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications—High-speed Physical Layer in the 5 GHz Band; 1999; pp. 1-83; Institute of Electrical and Electronics Engineers, Inc.

European Patent Office Examination Report in corresponding European application No. 11705731.5 mailed Jun. 14, 2013.

First Office Action in Chinese Application No. 201180007020.6, dated Sep. 1, 2014, with English translation (23 pages).

Communication Pursuant to Article 94(3) EPC in European Patent Application No. 11 705 731.5, dated Dec. 12, 2013 (4 pages).

Communication Pursuant to Article 94(3) EPC in European Patent Application No. 11 705 731.5, dated Nov. 11, 2014 (5 pages).

Perez-Costa, et al., "AU-APSD: Adaptive IEEE 802.11e Unscheduled Automatic Power Save Delivery," *IEEE Communications Society, IEEE Int'l Conf. on Comm., 2006 (ICC '06)*, vol. 5, pp. 2020-2027 (Jun. 1, 2006).

Notice of Reasons for Rejection in Japanese counterpart Application No. 2012-551356, 4 pages with translation (Aug. 19, 2014).

Notice of Reasons for Rejection in Japanese Application No. 2012-551356, dated Mar. 10, 2015, with English translation (3 pages).

Second Office Action in Chinese Application No. 201180007020.6, dated May 19, 2015, with English translation (10 pages).

\* cited by examiner

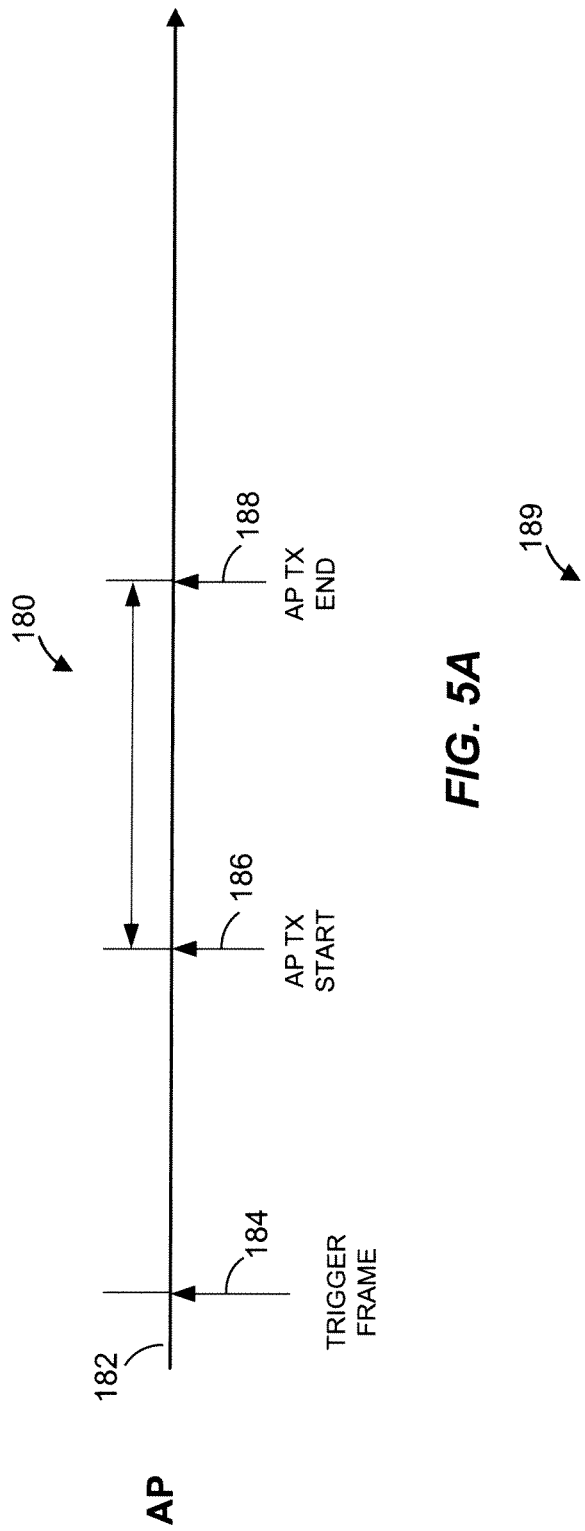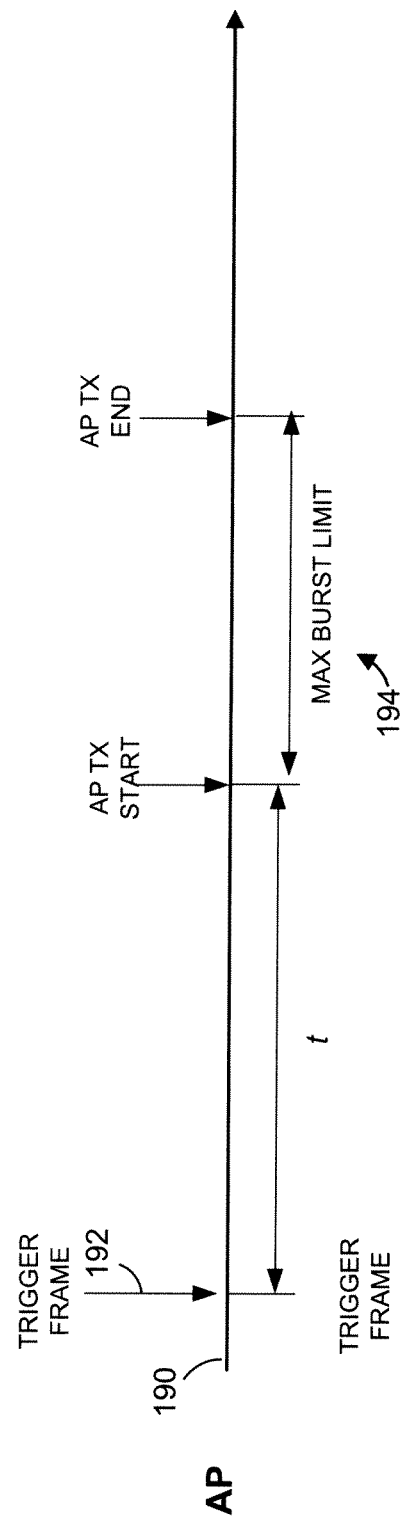

POWER SAVING FEATURES IN A COMMUNICATION DEVICE

CROSS-REFERENCE TO RELATED APPLICATION

This application claims the benefit of U.S. Provisional Patent Application No. 61/300,737, entitled "Supporting Powersave with Aggregation," filed Feb. 2, 2010, the entire disclosure of which is hereby expressly incorporated herein by reference.

FIELD OF THE DISCLOSURE

The present disclosure relates generally to communication systems and, more particularly, to power saving techniques in such communication systems.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11ac, that promises to provide even greater throughput.

SUMMARY

In an embodiment, a method in a communication network includes receiving a data unit that includes a request to transmit an aggregate data unit to a communication device, and, in response to receiving the data unit, generating an aggregate data unit for transmission to the communication device, where the aggregate data unit includes a plurality of component data units, each having a respective media access channel (MAC) header, and a duration of the aggregate data unit is determined using a parameter negotiated with the communication device.

In various implementations, one or more of the following features can be included. The plurality of component data units is a plurality of MAC protocol data units (MPDUs), and the aggregate data unit is an aggregate MPDU (AMPDU). The plurality of component data units is a plurality of MAC service data units (MSDUs), and the aggregate data unit is an aggregate MSDU (AMSDU). The received data unit includes a field that indicates the parameter. The parameter indicates a maximum duration of a burst within a service period (SP). The field includes n bits to indicate a maximum duration of a burst in multiples of x µs. The received data unit is an add traffic stream (ADDTS) communication frame. The method includes determining the duration of the aggregate data unit in view of a physical (PHY) data rate of a communication channel used to transmit the aggregate data unit to the communication device. The method includes separately negotiating the parameter for each stream available for transmitting the aggregate data unit to the communication device. Negotiating the parameter includes using an ADDTS communication frame. The method includes receiving an acknowledgement data unit that indicates which of the plurality of component data units have been successfully received at the communication device. The aggregate data unit is a first aggregate data unit, and the method includes generating a second aggregate data unit that (i) includes those of the plurality of component data units that have not been successfully received at the communication device and (ii) does not include those of the plurality of component data units that have been successfully received at the communication device. The acknowledgement data unit includes a bitmask, and each bit in the bitmask indicates whether a respective one of the plurality of component data units has been successfully received at the communication device. Generating the aggregate data unit includes generating exactly one aggregate data unit in response to receiving the data unit.

In an embodiment, an apparatus includes a trigger frame processor to receive a trigger frame, where the trigger frame includes a request to transmit an aggregate data unit to a communication device, an aggregate data unit transmit controller to determine a duration of an aggregate data unit to be transmitted to the communication device using a parameter negotiated with the communication device, and an aggregate data unit generator to generate the aggregate data unit in accordance with the determined duration, where the aggregate data unit includes a plurality of component data units, each of the plurality of component data units having a respective media access channel (MAC) header.

In various implementations, one or more of the following features can be included. The plurality of component data units is a plurality of MAC protocol data units (MPDUs), and the aggregate data unit is an aggregate MPDU (AMPDU). The trigger frame processor determines the parameter based on the trigger frame. The aggregate data unit transmit controller determines the duration of the aggregate data unit in view of a physical (PHY) data rate of a communication channel used to transmit the aggregate data unit to the communication device. The apparatus includes an acknowledgement (ACK) processor to process an acknowledgement data unit that indicates which of the plurality of component data units have been successfully received at the communication device.

In an embodiment, a method in a first communication device includes negotiating a parameter with a second communication device, where the parameter indicates a maximum duration of a time interval during which the first communication device can receive aggregated data from the second communication device, and receiving an aggregate data unit from the second communication device, where the aggregate data unit includes a plurality of component data units, each having a respective media access channel (MAC) header, and the aggregate data unit is received within the time interval.

In various implementations, one or more of the following features can be included. The method includes negotiating the parameter includes generating a trigger data unit that indicates the parameter, where the aggregate data unit is transmitted in response to the trigger data unit. The method includes negotiating the parameter includes generating an add traffic stream (ADDTS) communication frame that indicates the parameter. The method includes generating a trigger data unit, including not including an indication of the parameter in the trigger data unit, where the aggregate data unit is transmitted in response to the trigger data unit. The method includes determining a duration of a sleep time interval during which the first communication device does not receive aggregated data, and powering down at least one component of the first communication device for the duration of the sleep time interval. The method includes generating an acknowledgement in response to receiving the aggregate data unit, where the acknowledgement indicates which of the plurality of component data units have been successfully received. The aggregate data unit is a first data unit, and the method includes receiving a second aggregate data unit responsive to the acknowledgement, where the second aggregate data unit (i) includes those of the plurality of component data units that have not been successfully received at the communication device and (ii) does not include those of the plurality of component data units that have been successfully received at the communication device. The method includes negotiating the parameter for each stream available for receiving aggregated data from the second communication device. The first communication device is a station that operates in a wireless local area network (WLAN), and the second communication device is an access point (AP) that operates in the WLAN. The plurality of component data units is a plurality of MAC protocol data units (MPDUs), and the aggregate data unit is an aggregate MPDU (AMPDU). The method includes receiving periodic data from a third communication device during regularly scheduled timeslots and determining the maximum duration of the time interval in view of the regularly scheduled timeslots. The method includes receiving the aggregate data unit from the second communication device includes utilizing a first communication protocol and receiving periodic data from the third communication device includes utilizing a second communication protocol. The second communication protocol is the Bluetooth communication protocol. The method includes generating a trigger data unit that indicates the parameter, where the aggregate data unit is received between two consecutive regularly scheduled timeslots in response to the trigger data unit. The duration of the aggregate data unit is shorter than a duration of at least one of a (i) a service period (SP) or (ii) a transmission opportunity (TxOP) during which the aggregate data unit is transmitted.

In an embodiment, an apparatus for use in a first communication device includes an aggregate data unit timing controller to negotiate a parameter with a second communication device, where the parameter indicates a maximum duration of a time interval during which the first communication device can receive aggregated data from the second communication device, and an aggregate data unit processor to receive an aggregate data unit from the second communication device, where the aggregate data unit includes a plurality of component data units, each having a respective media access channel (MAC) header, and the aggregate data unit is received within the time interval.

In various implementations, one or more of the following features can be included. The apparatus includes a trigger frame generator to generate a trigger data unit that indicates the parameter, where the aggregate data unit is transmitted in response to the trigger data unit. The apparatus includes an acknowledgement generator to generate an acknowledgement in response to receiving the aggregate data unit, where the acknowledgement indicates which of the plurality of component data units have been successfully received. The apparatus includes a sleep controller to (i) determine a duration of a sleep time interval during which the first communication device does not receive aggregated data, and (ii) power down at least one component of the first communication device for the duration of the sleep time interval. The apparatus includes a periodic transmission controller to (i) receive periodic data from a third communication device during regularly scheduled timeslots, and (ii) determine the maximum duration of the time interval in view of a duration of the regularly scheduled timeslots.

BRIEF DESCRIPTION OF THE DRAWINGS

FIGS. 5A and 5B are timing diagrams that illustrate the timing of a burst during which an aggregate data unit is transmitted, according to two example scenarios;

DETAILED DESCRIPTION

Figure 1A:
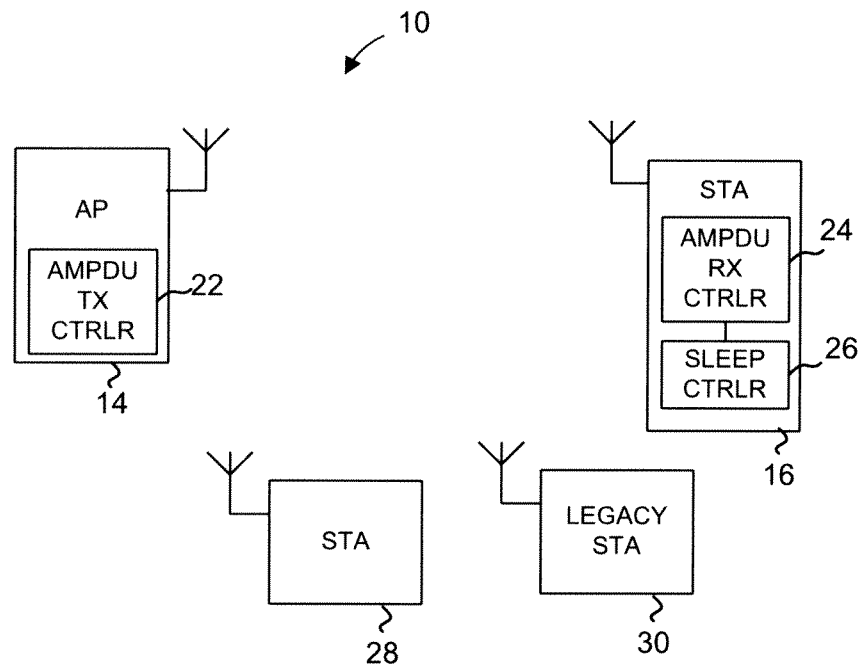
FIG. 1A is a block diagram of a communication system in which network devices utilize power saving techniques when transmitting or receiving aggregate data, according to an embodiment of the present disclosure.

FIG. 1 is a block diagram of an example embodiment of a wireless local area network (WLAN) 10 in which wireless network devices such as an access point (AP) 14 and a station (STA) 16 negotiate parameters for exchanging data using aggregate data units such as aggregate Media Access Control (MAC) protocol data units (AMPDUs), each including several "component" data units such as MPDUs, so as to efficiently utilize resources at the station 16 and/or the AP 14. To this end, in an embodiment, the AP 14 includes an AMPDU transmit (Tx) controller 22, and the station 16 includes an AMPDU receive (Rx) controller 24. Further, the station 16 in some embodiments also includes a sleep controller 26 to determine the duration of a period during which the station 16 sleeps (i.e., goes into a low power consumption power mode) to save power. As discussed in more detail below, the AP 14 and the station 16 in various embodiments of the present disclosure negotiate one or more of a duration of a period during which an aggregate data unit is transmitted, the beginning and the end of the period during which an aggregate data unit is transmitted, a maximum number of component data units to be transmitted within the aggregate data unit, a number of retries for each aggregate data unit, etc., referred to hereinafter to as "the resource saving parameter."

Hereinafter, a communication device such as the station 16 is said to sleep when the communication device powers down one or several components, such as transceiver circuitry, either completely or partially (e.g., by supplying smaller current) for a certain period of time. In some embodiments, a sleeping device still is configured to receive certain data units such as beacon frames transmitted according to a certain known schedule, for example. In various embodiments, devices such as the station 16 or the AP 14 utilize the techniques of the present disclosure (hereinafter, "the enhanced resource saving techniques") to increase potentially available sleep time, preserve processing resources and/or memory, and otherwise improve utilization of device resources by efficiently scheduling communications at the communication device.

For ease of explanation, enhanced resource saving techniques are discussed herein primarily in application to AMPDUs. However, in other embodiments, similar techniques are applied to other aggregate data units such as aggregate MAC service data units (MSDUs), for example. In at least some of the embodiments discussed herein, component data units are treated as separate data units at a MAC layer of a communication stack. In some of the embodiments, the component data units include one or more of respective MAC headers, delimiters, frame check sequence (FCS) fields, etc. Further, component data units in some embodiments are separate Ethernet frames that are aggregated into a single PHY data unit so as to better utilize available bandwidth. In an embodiment, an aggregate data unit is a Physical Layer Convergence Procedure (PLCP) protocol data unit (PPDU). Generally speaking, the techniques of the present disclosure are applicable to devices and systems in which at least some management information associated with payload portions of several respective component data units are aggregated into a common aggregate management portion to reduce the overhead associated with transmitting the several data units. For example, when several MPDUs are aggregated for transmission in a single communication frame, a common management portion includes a shared physical layer (PHY) preamble and a PHY header, in an embodiment. A communication frame, in at least some of the embodiments discussed herein, is a data unit that includes a respective physical layer (PHY) preamble. Further, in an embodiment, when several MPDUs are aggregated in a communication frame, at least a partial common MAC header is transmitted with an AMPDU that includes the several MPDUs.

In an embodiment, the WLAN 10 also includes a station 28 and a legacy station 30. The station 28 is generally similar to the station 16 and, in an embodiment, implements some or all of the enhanced resource saving techniques, and particularly power saving techniques supported by the station 16. On the other hand, the legacy station 30 supports either no enhanced resource saving techniques, or only legacy power techniques such as the known power save poll (PS-POLL) technique briefly discussed below.

In various embodiments, the WLAN 10 includes any suitable number of stations. In some scenarios, the AP 14 transmits data to each of the stations 16 and 26 using interleaving, i.e., by alternating periods of time during which data is transmitted to each of the stations 16 and 26 (or using another suitable technique for maintaining multiple concurrent data communication sessions with respective devices by dividing the available bandwidth). When the AP 14 transmits data specifically to the station 26, the station 16 typically does not need to listen for data transmitted from the AP 14, and the sleep controller 26 powers down the station 16 or one or more modules of the station 16 during these periods, according to an embodiment. Further, to increase the time during which the sleep controller 26 can power down the station 16 without the risk of missing data transmitted to the station 16, the AP 14 and the station 16 in some embodiments negotiate efficient grouping of several MPDUs into an AMPDU transmitted as a single PHY data unit. For example, in an embodiment, the station 16 indicates a maximum duration of a time interval during which the station 16 can receive data from the AP 14, and the AP 14 determines the number of MPDUs to be transmitted within an AMPDU in accordance with the indication from the station 16. In this manner, the AP 14 and the station 16 decrease the overhead associated with transmitting a separate communication frame, for example.

Figure 1B:
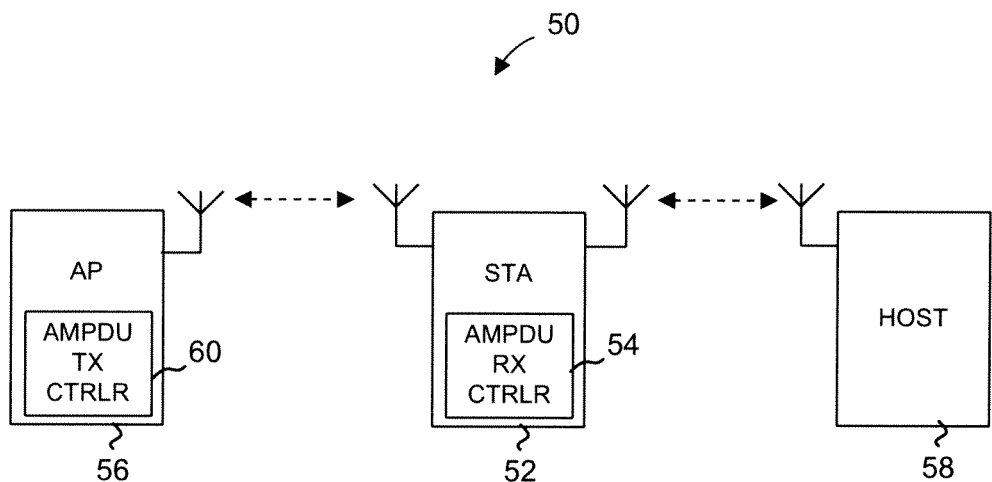
FIG. 1B is a diagram of a communication system in which a communication device utilizes power saving techniques of the present disclosure when concurrently communicating with a first network device using a first wireless communication protocol and a second network device using a second wireless communication protocol, according to an embodiment.

In another embodiment illustrated in FIG. 1B, a communication network 50 includes a station 52, equipped with an AMPDU Rx controller 54, that communicates with both an AP 56 and a host 58 using respective communication protocols, so that the station AP 56 and the host 58 operate as co-located interferers relative to the station 52. For example, the station 52 communicates with the AP 56 using a wireless communication protocol generally similar to the IEEE 802.11n standard or another scheme suitable for operating a WLAN, and also communicates with the host 58 using another wireless communication protocol suitable for short-range communications such as the Bluetooth communication protocol. In an embodiment, the station 52 transmits data to the host 58 or receives data from the host 58 according to a periodic schedule (e.g., during 1.25-millisecond Synchronous Connection Oriented (SCO) timeslots (specified in the Bluetooth standard) separated by 2.5-millisecond intervals). On the other hand, the station 52 communicates with the AP 56 during time periods that are negotiated on ad-hoc basis or announced by the AP 56 at the beginning of a superframe, according to an embodiment. In an embodiment, the AMPDU Rx controller 54 of the station 52 efficiently schedules communications with the AP 56 so that the station 52 wakes up only when it is necessary to communicate with the AP 56 or the host 58. Further, in an embodiment, the AP 56 includes a AMPDU Tx controller 60 to negotiate the resource saving parameters.

Figure 2:
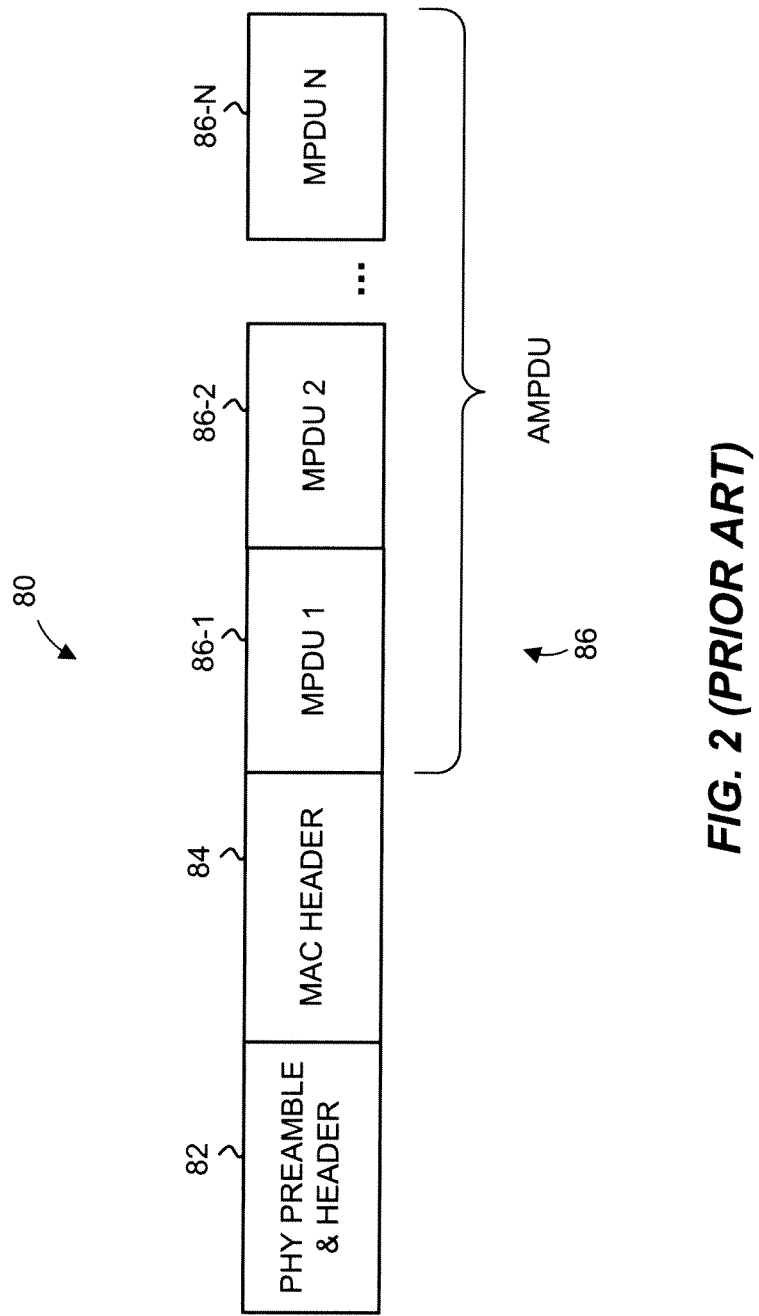
FIG. 2 is a diagram of a known data unit having an aggregate Media Access Control (MAC) protocol data unit (AMPDU) that includes several MPDU sub-frames.

As background, FIG. 2 is a diagram of a known data unit 80 that includes a PHY preamble and header portion 82, a MAC header 84, and an AMPDU portion 86 that includes N MPDUs 86-1, 86-2, . . . 86-N. All MPDUs included in an AMPDU usually are addressed to the same receiving device. Also, each MPDU typically includes a respective MAC header (with the information specific to the MPDU) to facilitate reassembly of a data stream at a receiving device, and is typically limited to a certain length that is significantly smaller than the maximum length of the payload of the data unit 80. The portion of the data unit 80 that follows the MAC header 84 accommodates at least two MPDUs of maximum allowed length.

Figure 3:
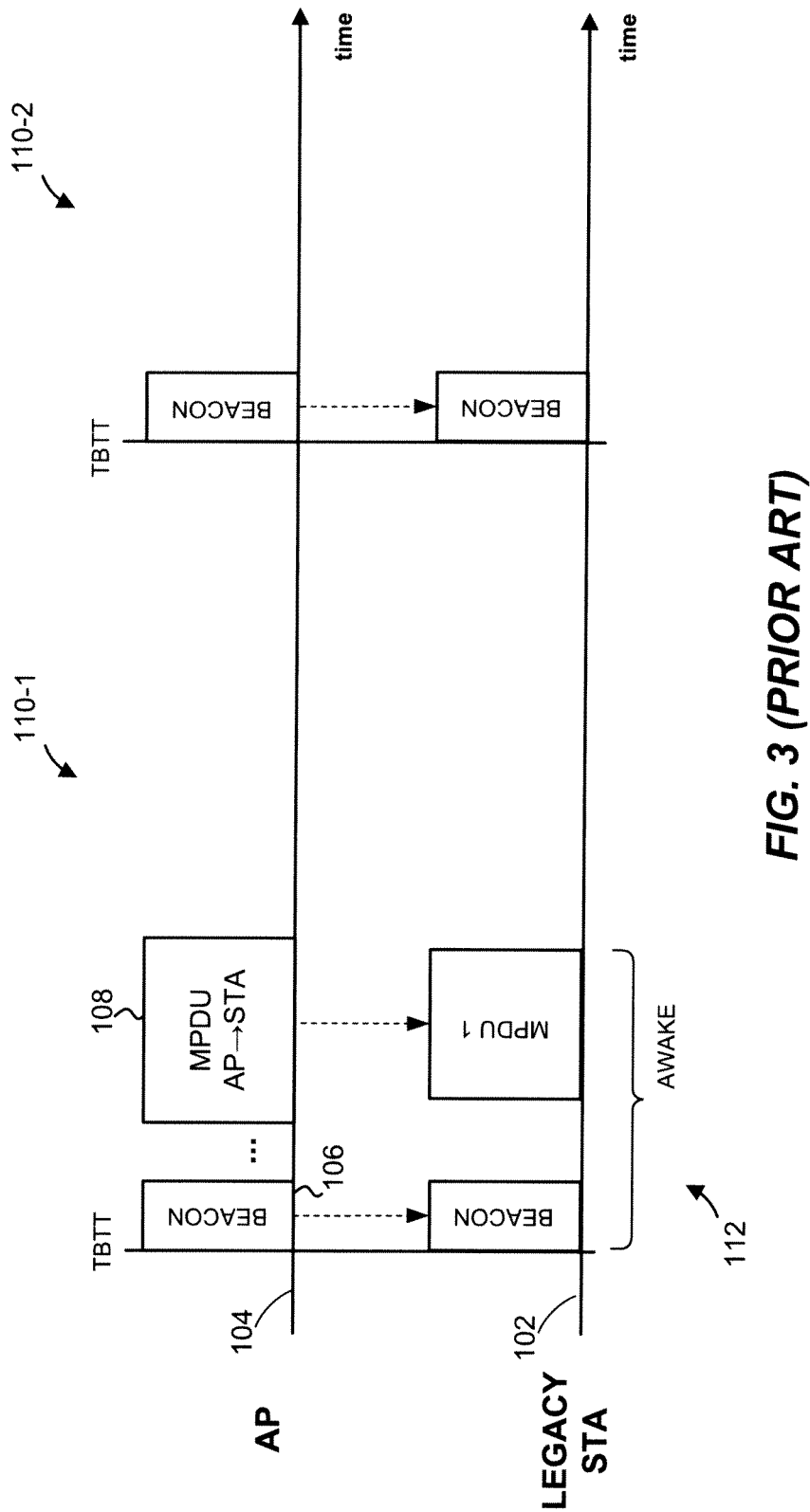
FIG. 3 is a timing diagram that illustrates a known technique according to which an AP indicates the availability of an aggregate data unit for a certain station in a beacon frame.

Next, as further background, FIG. 3 is a timing diagram of a known PS-POLL technique that a legacy station 102 or a similar legacy device implements to save power when the station 102 is not receiving data. In an embodiment, the legacy station 30 that operates in the WLAN 10 (see FIG. 1) implements the PS-POLL technique of FIG. 3. An AP 104 supports the PS-POLL technique and, in an embodiment, is a legacy AP that does not support any of the enhanced resource saving techniques. However, in another embodiment, an AP supports both the PS-POLL technique of FIG. 3 as well as at least some of the enhanced power saving techniques. For example, in an embodiment, the AP 14 that operates in the WLAN 10 depicted in FIG. 1 supports both the PS-POLL technique of FIG. 3 and the enhanced resource saving techniques and accordingly is capable of utilizing power saving techniques both with legacy devices such as the station 30 and non-legacy devices such as the station 16, for example. Further, in an embodiment, an AP that supports both the PS-POLL technique and the enhanced resource saving techniques is configurable to operate in the enhanced resource saving mode or in the legacy mode, in which case the PS-POLL technique is used with both legacy and non-legacy stations. In another embodiment, the AP 14 capable of operating in the enhanced resource saving mode and/or the legacy mode decides to not utilize any power saving techniques when communication with the legacy station 30.

The AP 104 initially transmits a beacon 106 to the station 102 at the beginning of a superframe 110-1, demarcated at both ends by a beacon transmission time (TBTT). The beacon 106 includes an indication that an MPDU 108 is available for transmission to the station 104. In some cases, the beacon 106 includes several respective indications for several stations. The station 104 stays awake for the entire duration of a PS-POLL period 112 to receive the MPDU 108 in a corresponding communication frame if the indication identifies the station 104. In some cases, the station 104 explicitly acknowledges the indication in the beacon 106 using a response communication frame (not shown), so that the AP 102 knows that the station 104 is prepared to receive the MPDU 108. During the time period 112, the AP 102 in some cases transmits multiple MPDUs to multiple respective stations, although each station receives only one MPDU during a single PS-POLL period. The station 104 in this case is awake and listens to and (at least partially) processes communication frames transmitted to other stations.

In some embodiments, an AP that supports enhanced resource saving techniques limits the number of MPDUs transmitted to a legacy station within one PS-POLL period to one. In one such embodiment, the AP maintains only a single power save queue that stores MPDUs to be transmitted during one or several PS-POLL periods. In other words, the AP in this embodiment need not maintain power save queues on a per-station basis.

However, in other embodiments, an AP aggregates several MPDUs into a single AMPDU, to be transmitted within a single corresponding communication frame following an indication included in a beacon frame. In one such embodiment, the beginning of the beacon coincides with the beginning of the superframe. In another embodiment, however, the beacon is transmitted at a later time within the superframe. In general, it is possible to transmit the beacon that includes the indication during a beacon time (BT) timeslot, an allotment time (AT) timeslot, or another suitable timeslot of a communication frame.

Next, several example techniques for efficiently transmitting aggregated data such as an AMPDU between a pair of devices are discussed with reference to FIGS. 4-7. Some or all of these techniques are utilized in the communication network 10 or 50, in an embodiment. In some embodiments, the enhanced resource saving techniques are applied along with unsolicited automatic power save delivery (UAPSD) techniques, also referred to as WiFi multimedia power saving (WMM-PS).

Figure 4:
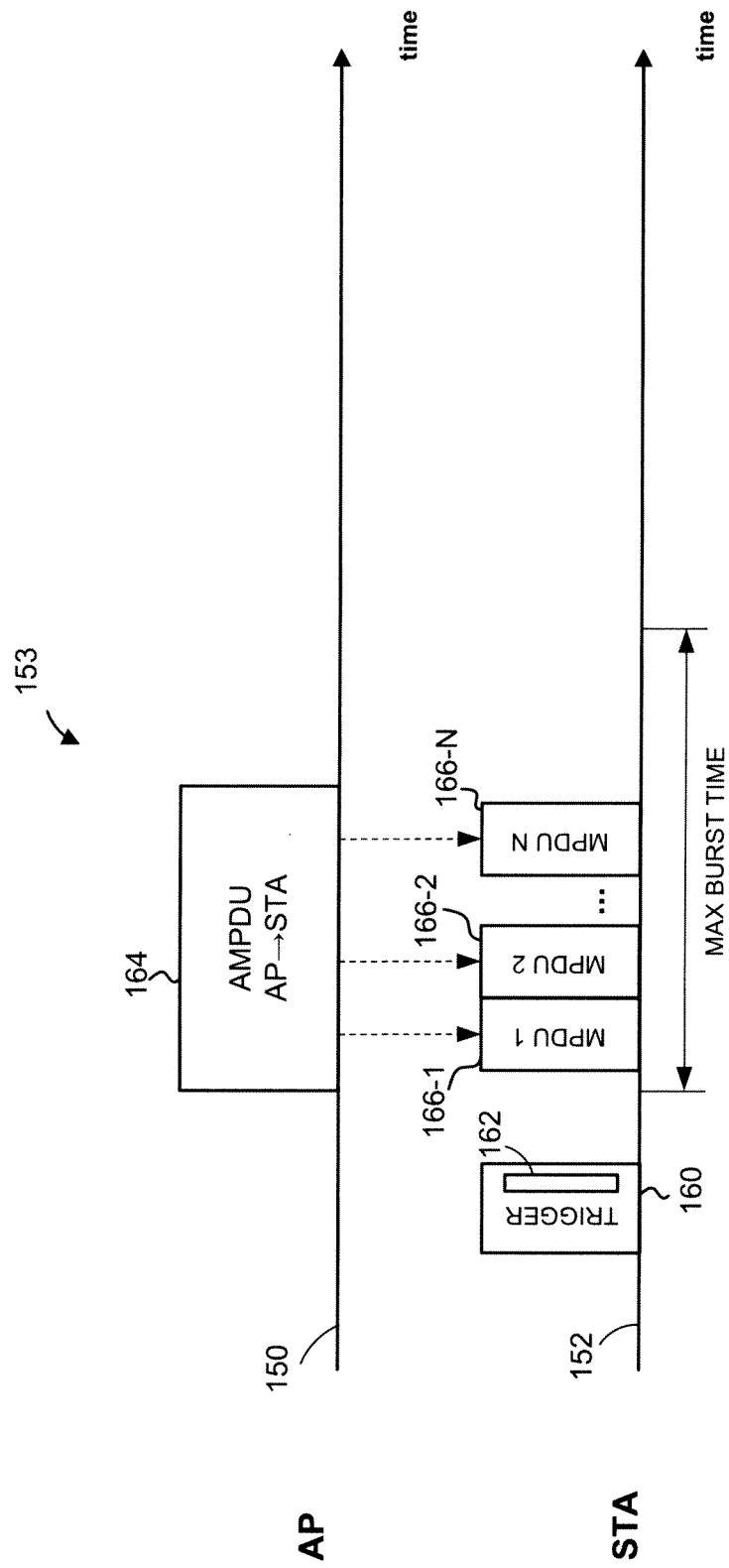
FIG. 4 is a timing diagram that illustrates transmitting an aggregate data unit in response to receiving a trigger frame, in an embodiment.

FIG. 4 is a timing diagram illustrating an example method for transmitting an AMPDU, according to an embodiment. An AP 150 transmits aggregated data to a station 152 in response to a request from the station 152 during a certain service period (SP) 153, according to an embodiment. The station 152 generates a trigger frame 160 that includes an element 162 that indicates one or more resource saving parameters to be used in transmitting an aggregated data unit such an AMPDU, and the AP 150 generates a communication frame with AMPDU 164 including MPDUs 166-1, 166-2, . . . 166-N in accordance with the one or more resource saving parameters indicated by the element 162, in an embodiment. For example, in an embodiment, the element 162 indicates a maximum number M of MPDUs to be transmitted using the a communication frame 164, so that N≤M. The maximum number M additionally conforms to a predetermined limit $M_{MAX}$ associated with the communication protocol utilized by the AP 150 and the station 152, so that $M \leq M_{MAX}$.

In another embodiment, the element 162 specifies or indicates a maximum burst time $T_{MAX}$, i.e., the maximum duration of a communication frame that includes the AMPDU 164. The AP 150 determines the maximum burst time $T_{MAX}$ in view of the PHY data rate being used to ensure that the station 152 can accurately determine a time during which the station 152 can sleep regardless of the PHY data rate used by the AP 150, according to an embodiment. When the station 152 indicates (directly or indirectly) the duration of a time interval during which the station 152 can receive aggregated data, the station 152 need not stay awake during a longer period of time such as a transmission opportunity (TxOP) or an SP if aggregated data does not take up the entire TxOP or SP.

However, in an another embodiment, the element 162 indicates a duration of the SP during which the AMPDU 164 is to be transmitted. Still further, the element 162 in yet another embodiment indicates a maximum duration of a transmission opportunity (TxOP) during which the AMPDU 164 is to be transmitted. As is known, the term TxOP generally corresponds to a time period during which a network device gains sole access to a shared communication channel for transmission.

In some embodiments, the AP 150 and the station 152 exchange several communication frames to negotiate one or several resource saving parameters. For example, the AP 150 transmits a communication frame (not shown) in response to the trigger frame 160 to acknowledge and, in some cases, to modify the values of the one or more resource saving parameters indicated in the element 162. However, in an another embodiment, the AP 150 does not explicitly acknowledge the communication frame 160 prior to transmitting the communication frame 164. Further, in some embodiments, the AP 150 and the station 152 negotiate parameters for each communication stream if the AP 160 and the station 152 support a multi-stream communication mode such as a multiple-input, multiple-output (MIMO) mode.

In some embodiments, the element 162 indicates a maximum duration of a burst (e.g., a contiguous transmission of several MPDUs in an aggregated manner) allowed in an SP. In other embodiments, however, the element 162 indicates the absolute timing (i.e., the start time, the end time) of the burst. FIG. 5A is a timing diagram 180 illustrating an example in which an AP 182 receives a trigger frame 184 that specifies a start time 186 and an end time 188, or in another embodiment, includes information based on which the AP 182 determines the start time 186 and the end time 188. On the other hand, FIG. 5B is a timing diagram 189 illustrating an example in which an AP 190 in another embodiment receives a trigger frame 192 that that specifies a maximum burst duration 194 or includes information based on which the AP 190 determines the maximum burst duration 194. As compared to the AP 182 of FIG. 5A, the AP 190 in at least some scenarios varies the duration of a time interval t between receiving the trigger frame 192 and the beginning of the burst. However, the AP 190 schedules the beginning of the burst so as to transmit aggregate data within the SP in which the station 152 expects to receive the aggregated data.

Figure 6:
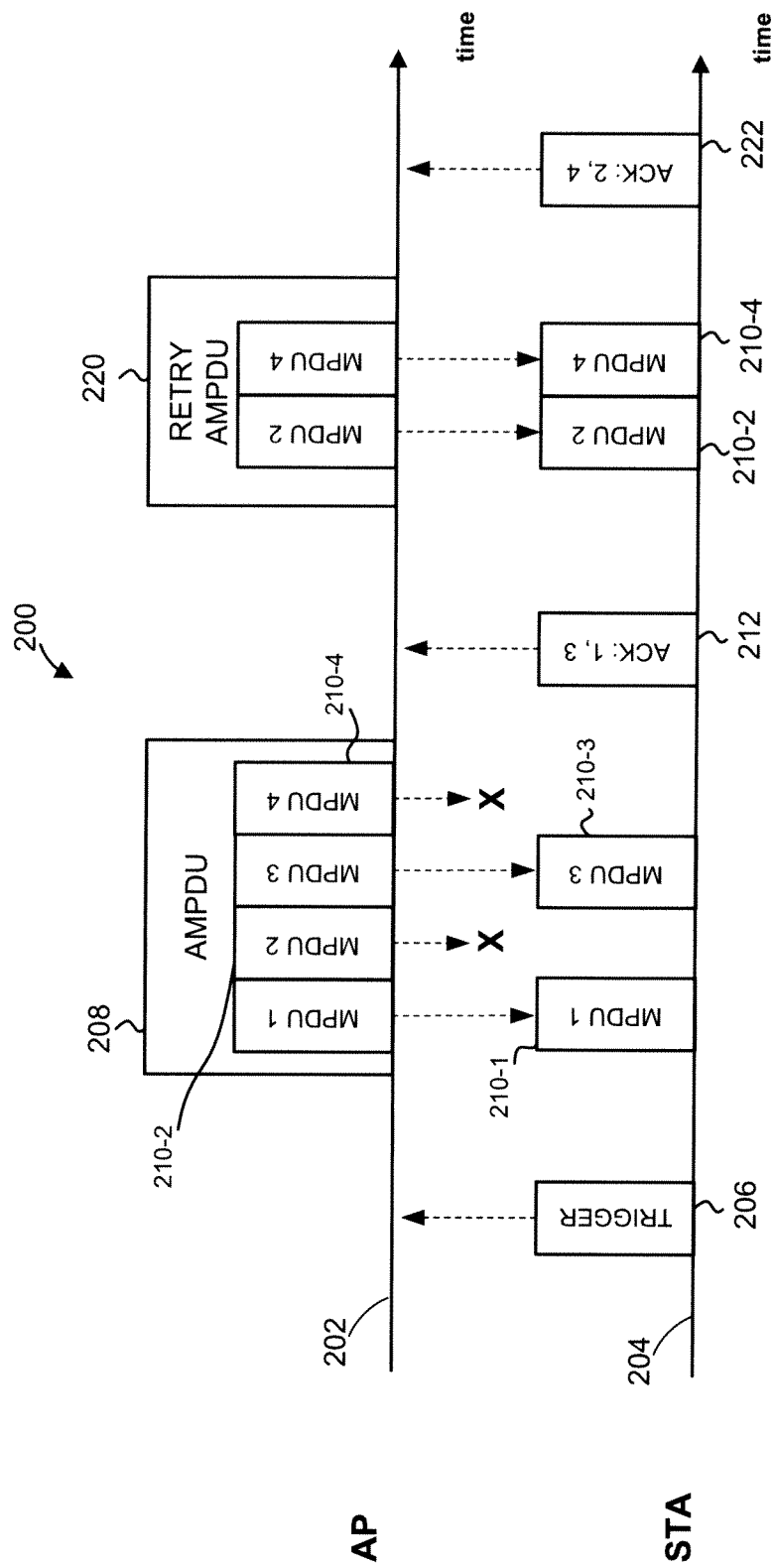
FIG. 6 is timing diagram that illustrates transmitting an aggregate data unit in response to receiving a trigger frame and transmitting a retry aggregate data unit in response to receiving a partial acknowledgement, in an embodiment.

In some cases, a station does not successfully receive every MPDU transmitted in an AMPDU. FIG. 6 is timing diagram that illustrates an example technique for transmitting a retry AMPDU in response to receiving a partial acknowledgement to a communication frame that includes the AMPDU, according to an embodiment. In an example exchange 200, a station 204 transmits a trigger frame 206 to an AP 202 and, in response, the AP 202 generates a communication frame 208 that includes an AMPDU having four MPDUs 210-1, 210-2, 210-3, and 210-4. The station 204 successfully receives the MPDUs 210-1 and 210-3 but does not receive the MPDUs 210-2 and 210-4. In an embodiment, the station 204 generates an acknowledgement frame 212 that indicates that the MPDUs 210-1 and 210-3 have been received. For example, in accordance with one embodiment, the acknowledgement frame 212 includes a bitmask in which bit flags indicate whether respective MPDUs have been received.

Upon receiving the acknowledgement frame 212, in an embodiment, the AP 202 generates a communication frame 220 that includes only those of the MPDUs 210-1, 210-2, 210-3, and 210-4 that have not been successfully transmitted to the station 204. In the example scenario depicted in FIG. 6, the communication frame 220 includes an AMPDU having MPDUs 210-2 and 210-4. After the MPDUs 210-2 and 210-4 are successfully delivered, the station 204 generates and transmits an acknowledgement frame 222 that indicates that the MPDUs 210-2 and 210-4 are successfully received.

In at least some of the embodiments, the duration of the exchange 200 is limited to a parameter negotiated between the AP 202 and the station 204. For example, the AP 202 and/or the station 204 ensure that the exchange 200 occurs within a negotiated maximum burst time, according to an embodiment. Further, as indicated above, the time limit for completing the exchange 200 in some embodiments is derived from another negotiated parameter such as the maximum number of MPDUs M to be transmitted within the corresponding SP.

Figure 7:
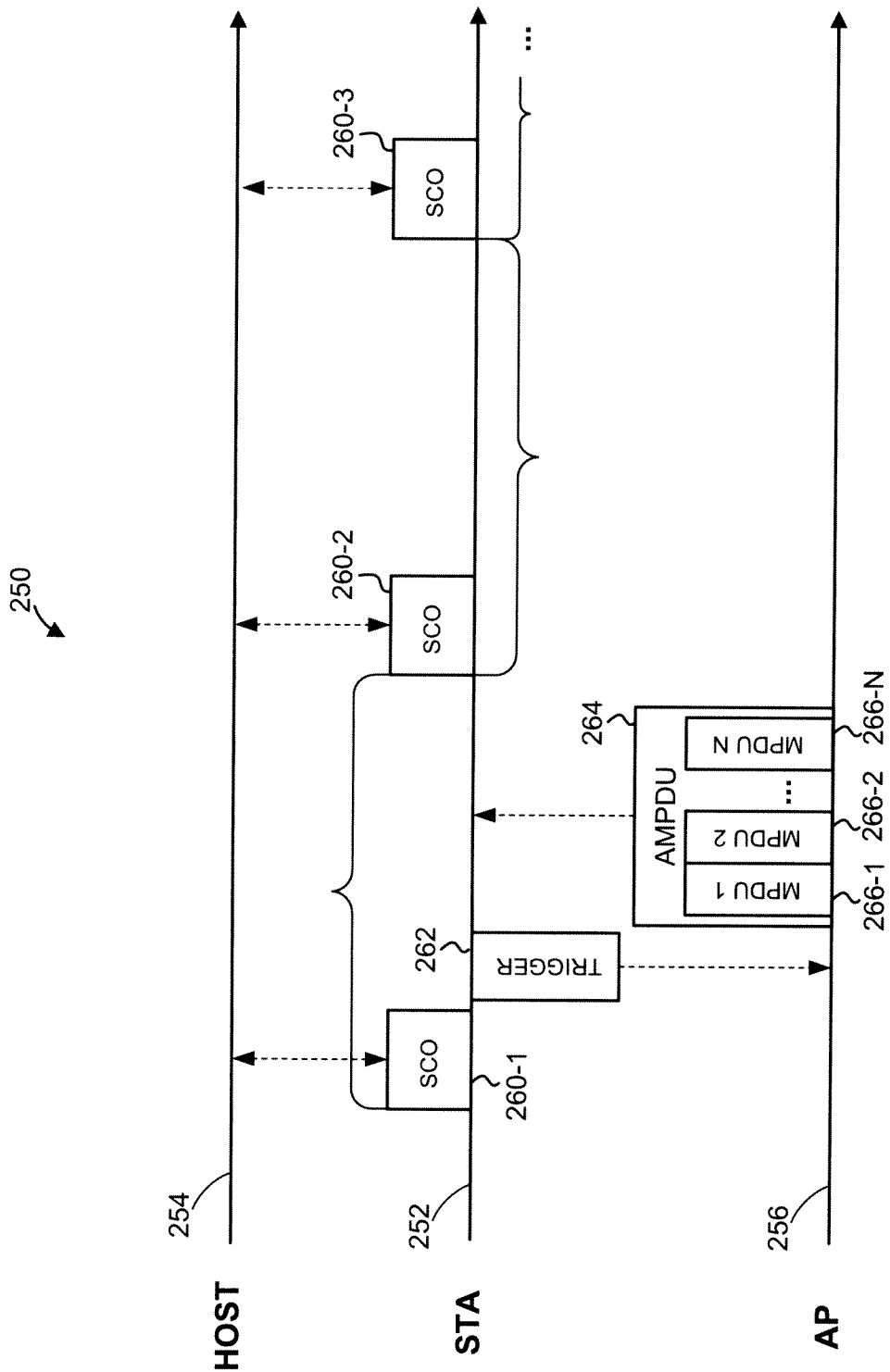
FIG. 7 is a timing diagram that illustrates periodic communications between a station and a host that occur concurrently with transmitting an aggregate data unit from an access point (AP) to the station, in an embodiment.

FIG. 7 is a timing diagram of communications between a station 252, a host 254, and an AP 256. The station 252 transmits periodic data to the host 254 and/or receives periodic data from the host 254 during a time period 250 (that may span one or several superframes, one or several service periods, etc.) and, during the same time period 250, receives aggregated data from the AP 256, according to an embodiment. Communications between the station 252 and the host 254 are scheduled in regularly occurring timeslots or SCOs 260-1, 260-2, etc., in an embodiment. For example, each SCO 260-1, 260-2, etc. is 1.25 ms long, and separated from the next SCO by 2.5 ms in an example implementation. To efficiently control the resources expended at the station 252, particularly power consumption, the station 252 generates a trigger frame 262 following the SCO 260-1 that indicates a duration and/or other limitations of a time period during which the station 252 can receive data from the AP 256 prior to communicating with the host 254 again in the next scheduled SCO, according to an embodiment. In an example scenario, the station 252 learns that aggregate data is available at the AP 256 for transmission to the station 252 from a beacon frame (not shown) transmitted by the AP 256. In response to the trigger frame 262, the AP 256 transmits a communication frame 264 with MPDUs 266-1, 266-2, . . . 266-N aggregated into a single AMPDU, in an embodiment. In this manner, the station 252 efficiently avoids collisions between data units received from the host 254 and the AP 256 and accurately determines time periods during which the station 252 can sleep, according to an embodiment.

For example, in the example illustrated in FIG. 7, the station 252 knows that it can sleep following the reception of the communication frame 264 until the beginning of the SCO 260-2, and again between the end of the SCO 260-2 and the beginning of the SCO 260-3. Because the station 252, in at least some of the embodiments, negotiates (e.g., specifies in the trigger frame 262) the maximum duration of the communication frame 264, the station 252 need not stay awake for the duration of a TxOP or an SP, for example. Moreover, the station 252 in an example scenario reduces the total number of AMPDUs used for transferring a certain block of information, and accordingly decreases the overhead associated with transmitting this block of information, by specifying a duration of the communication frame 264 that extends to the start or nearly the start of the SCO 260-2 (rather than relying on the AP 256 to determine a duration of the communication frame 264 that is less efficient).

Figure 8:
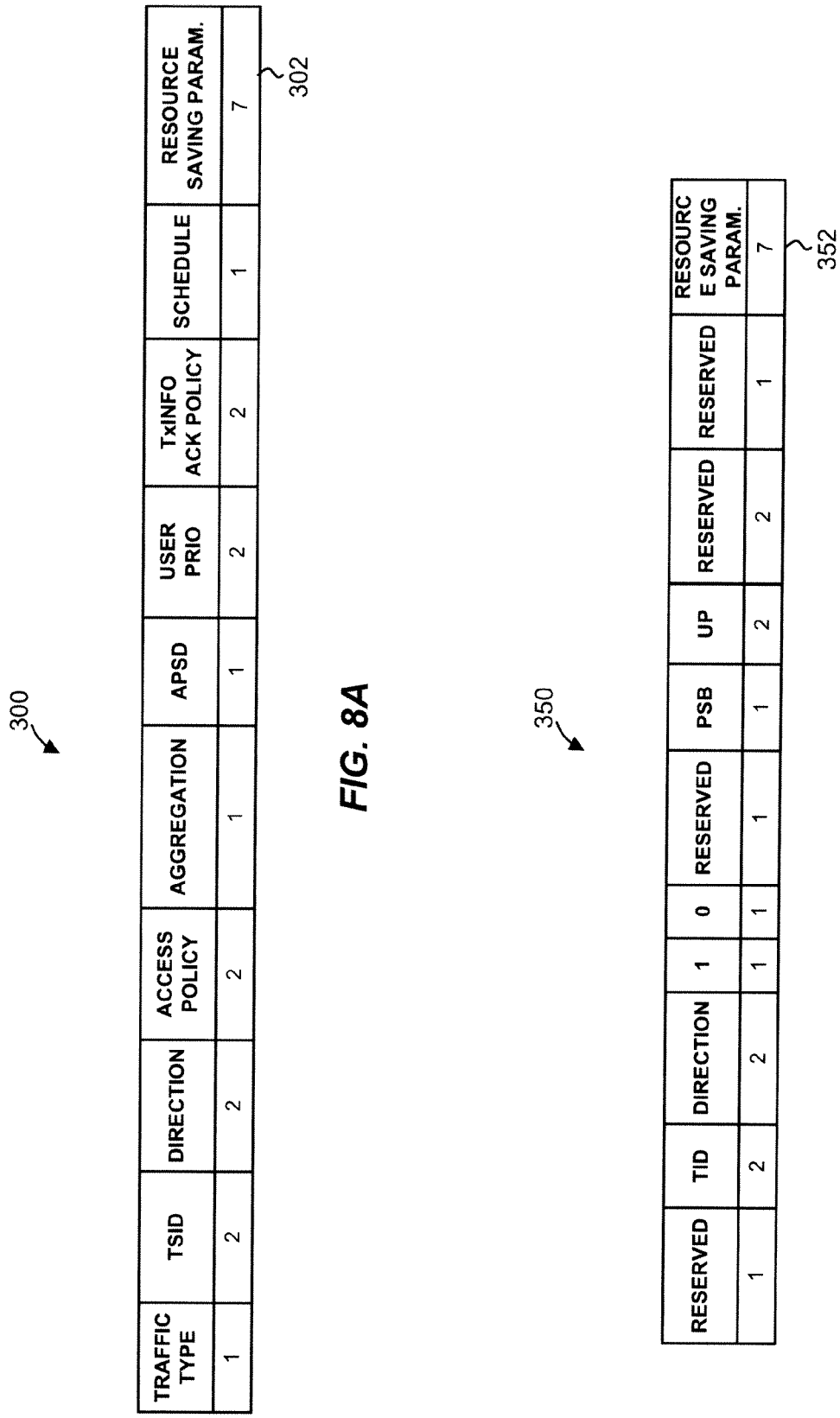
FIG. 8A is a block diagram of an example information element that is used to negotiate the timing of a period during which an aggregate data unit is transmitted, according to an embodiment.
FIG. 8B is a block diagram of another example information element that is used to negotiate the timing of a period during which an aggregate data unit is transmitted, according to an embodiment.

In an embodiment, a communication device such as the station 152 or 204, for example, uses one or more fields in an information element consistent with a format 300 or 350 illustrated in FIG. 8A and FIG. 8B, respectively, to specify the maximum burst time for transmission of aggregated data units such as MPDUs, the maximum number of data units to be transmitted within an aggregate data unit, or another resource saving parameter used with the techniques of the present disclosure. In an embodiment, the element 162 included in the trigger frame 160 (see FIG. 4) is consistent with the format 300 or 350. Further, depending on the embodiment, an element that conforms to the format 300 or 350 is included in a trigger frame, an add traffic stream (AD-DTS) frame used to set up a timeslot for a certain purpose, or another suitable communication frame.

Referring specifically to FIG. 8A, an information element formatted according to the format 300 is generally similar to a time slot information (TSINFO) element of the draft IEEE 802.11n Standard (2007), except that the format 300 includes a resource saving parameter field 302, in an embodiment. The field 302, in an embodiment, is a seven-bit field that specifies a duration limitation parameter (e.g., the maximum duration of a communication frame that includes an aggregate data unit such as an AMPDU, the maximum duration of an SP, the maximum duration of a TxOP, etc.) in multiples of 32 µs. In another embodiment, the field 302 is a four-bit field specifies a data unit limitation parameter (e.g., the maximum number of MPDUs to be included in a single AMPDU). Further, in an embodiment, the field 302 that specifies a value n so that the number of MPDUs to be included in a single AMPDU is $2^{n+1}$.

Depending on the embodiment, the resource saving parameter field 302 occupies the (currently reserved) bits 17-23 of the TSINFO element of the draft IEEE 802.11n Standard (2007) or augments the existing TSINFO element of the draft IEEE 802.11n Standard (2007), for example.

An information element formatted according to the format 350 illustrated in FIG. 8B is generally similar to a TSINFO element used in WMM systems, except that the format 350 includes a resource saving parameter field 352, in an embodiment. The resource saving parameter field 352 is similar to the field 302 in at least some of the embodiments. In various embodiments, the field 352 occupies bits 17-23 of the TSINFO element of the WMM specification, some or all of bits 14-15 or 16, some other portion of the TSINFO element, or augments the existing TSINFO element.

Figure 9:
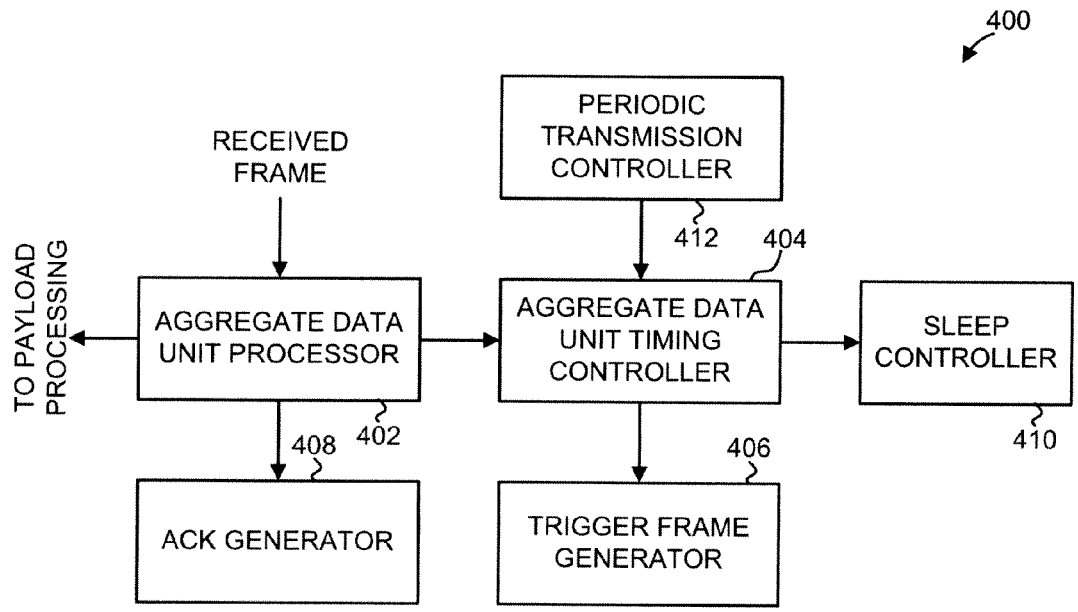
FIG. 9 is a block diagram of an example receiver configured to process an aggregate data unit and that implements at least some of the techniques of the present disclosure, according to an embodiment.

Next, FIG. 9 is a block diagram of an example receiver 400 that processes aggregate data units and implements at least some of the enhanced power techniques of the present disclosure, according to an embodiment. The receiver 400, in one embodiment, includes an aggregate data unit processor 402, an aggregate data unit timing controller 404, a trigger frame generator 406, and an ACK generator 408. In an embodiment, the receiver 400 also includes a sleep controller 410. Further, in an embodiment, the receiver includes a periodic transmission controller 412.

According to an embodiment, in operation, the aggregate data unit timing controller 404 determines one or several efficient resource saving parameters and supplies indications of these parameters to the trigger frame generator 406, in an embodiment. The frame generator 406 generates a trigger frame including at least one efficient resource saving parameter indicator (e.g., an index to an entry in a look-up table stored at each of the receiver and the transmitter, with the desired parameter stored in the entry). The trigger frame is then transmitted to an AP or similar device capable of aggregating several data units into an aggregate data for transmission to the receiver 400.

In an embodiment, the aggregate data unit processor 402 processes a received communication frame that includes an aggregate data unit such as an AMPDU, extracts the component data units such as MPDUs for payload processing by the processor 402 or other components (not shown), and the ACK generator 408 generates a corresponding full or partial acknowledgement (applying the technique illustrated in FIG. 6, for example).

Further, in an embodiment, when the receiver 400 transmits and/or receives periodic data in addition to receiving aggregate data units, the periodic transmission controller 412 cooperates with the aggregate data unit timing controller 404 so that aggregate data units such as AMPDUs are received in response to corresponding trigger frames between certain SCOs. In an example embodiment, the periodic transmission controller 412 and the aggregate data unit timing controller 404 support the techniques illustrated in FIG. 7.

The aggregate data unit timing controller 404, in accordance with some embodiments, also supplies resource saving parameter information to the sleep controller 410, which determines when the receiver 400 can sleep and when the receiver 400 should wake up. To continue with the example above, the periodic transmission controller 412 in one embodiment implements the technique illustrated in FIG. 7, and the aggregate data unit timing controller 404 accordingly provides information to the sleep controller 410 regarding the timing of SCOs (e.g., start time, end time, the period) and the timing of negotiated periods for receiving aggregate data (e.g., earliest start time, latest end time).

Figure 10:
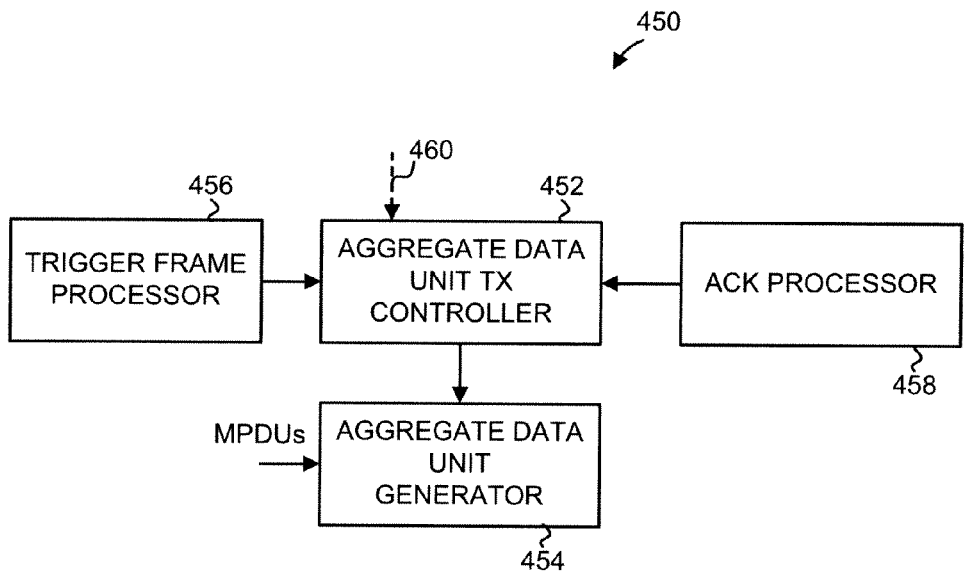
FIG. 10 is a block diagram of an example transmitter configured to generate an aggregate data unit and that implements at least some of the techniques of the present disclosure, according to an embodiment.

FIG. 10 is a block diagram of an example transmitter 450 configured to generate aggregate data units such as AMPDUs according to the techniques of the present disclosure. In an embodiment, the transmitter 450 includes an aggregate data unit transmit (Tx) controller 452, an aggregate data unit generator 454, a trigger frame processor 456, and an ACK processor 458. During operation, the aggregate data unit Tx controller 452 determines the timing and the content of an aggregate data unit in view of one or several resource saving parameters supplied in a trigger frame and processed by the trigger frame processor 456, according to an embodiment. However, in another embodiment, the aggregate data unit Tx controller 452 obtains one or several resource saving parameters from another source (schematically illustrated as an input 460) such as a pre-configured parameter associated with the communication protocol supported by the transmitter 450, a parameter supplied in an ADDTS frame, a parameter obtained from a table, a parameter negotiated during an association period (e.g., when a station becomes associated with a piconet, and if the transmitter 450 is an AP operating in the piconet), etc.

In an embodiment, the aggregate data unit Tx controller 452 is coupled to the aggregate data unit generator 454 to control the number and/or size of data units included in an aggregate data unit. For example, in an embodiment, the aggregate data unit Tx controller 452 ensures that the aggregate data unit generator 454 includes no more than four MPDUs in an AMPDU to be transmitted in a corresponding communication frame to a certain receiver.

The ACK processor 458 processes acknowledgement frames received from a communication device to which an aggregate data unit has been transmitted. In an embodiment, the ACK processor 458 processes partial acknowledgement frames that specify which of the transmitted MPDUs have been successfully received based on a bitmask in the acknowledgement frame, for example. In another embodiment, however, the ACK processor 458 processes only full acknowledgement frames that indicate whether every MPDU in an AMPDU has been successfully received. The ACK processor 458 provides the information regarding the delivered or undelivered MPDUs to the aggregate data unit Tx controller 452 that in some embodiments causes the aggregate data unit generator 454 to generate a retry communication frame. As discussed above, in an embodiment, the retry communication frame includes only those MPDUs that previously have not been successfully delivered. Further, in at least some of the embodiments, the aggregate data unit Tx controller 452 ensures that the transmission of a communication frame including the AMPDU and, if necessary, the retry communication frame occurs within the time period or other parameters negotiated with the receiver of the AMPDU.

Referring back to FIG. 1A, the AMPDU Tx controller 22 of the AP 14, in an embodiment, includes at least some of the components 452-458 of the transmitter 450. Further, in an embodiment, AMPDU Rx controller 24 of the station 16 includes at least some of the components 402, 406, 408, and 412 of the receiver 400, and the sleep controller 26 includes, or is similar to, the sleep controller 410.

Figure 11:
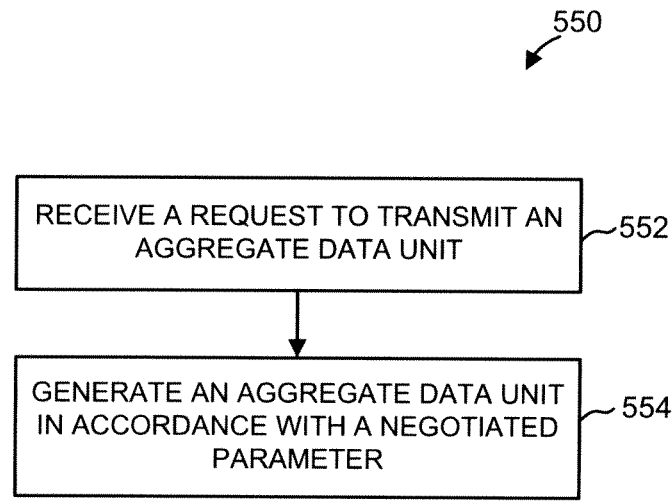
FIG. 11 is a flow diagram of an example method for generating an aggregate data unit having a size that corresponds to a negotiated parameter, according to an embodiment.

FIG. 11 is a flow diagram of an example method 550 for generating an aggregate data unit. In various embodiments, the method 550 is at least partially implemented in some or all of the trigger frame processor 456, the aggregate data unit Tx controller 452, and the aggregate data unit generator 454. At block 552, a request to transmit an aggregate data unit (e.g., an AMPDU) is received. For example, the request included in or is a trigger frame, in an embodiment. Next, at block 554, an aggregate data unit is generated in accordance with at least one parameter (e.g., number of MPDUs, duration of a TxOP) negotiated with the communication device whose request is processed at block 552. Depending on the embodiment, the at least one parameter is indicated in the received request or using other communication frames or pre-configured protocol parameters, for example.

Figure 12:
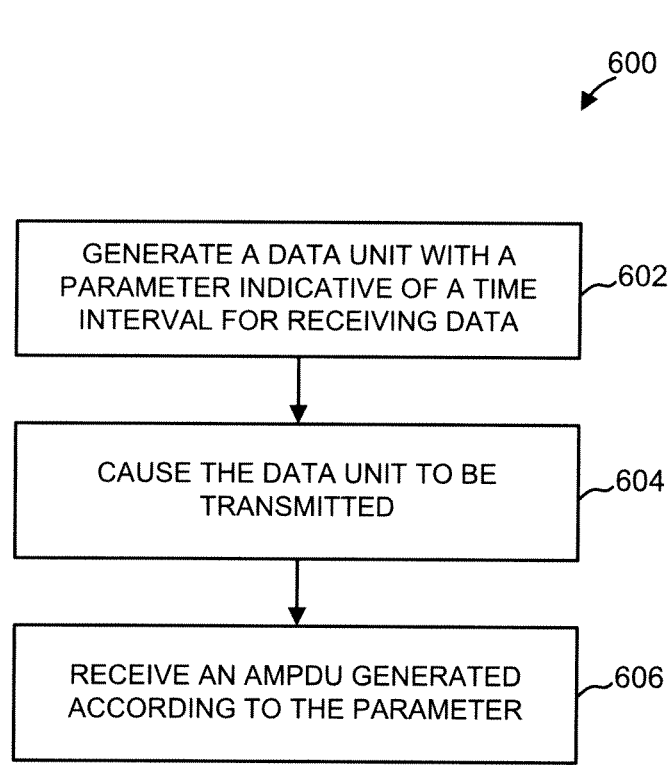
FIG. 12 is a flow diagram of an example method for generating a request to receive an aggregate data unit having a size that corresponds to a negotiated parameter, according to an embodiment.

Referring to FIG. 12, an example method 600 for generating a request to receive an aggregate unit is at least partially implemented in some or all of the aggregate data unit timing controller 404, the trigger frame generator 406, the aggregate data unit processor 402, and other components of the receiver 400 (see FIG. 9), according to an embodiment. At block 602, a request such as a trigger frame is generated including a parameter that indicates a time interval for receiving aggregate data (e.g., the maximum burst time). Next, at block 604, the request is transmitted. At block 606, an AMPDU that conforms to the parameter included in the transmitted data unit is received. In another example embodiment, however, the aggregate data unit includes several MSDUs.

Figure 13:
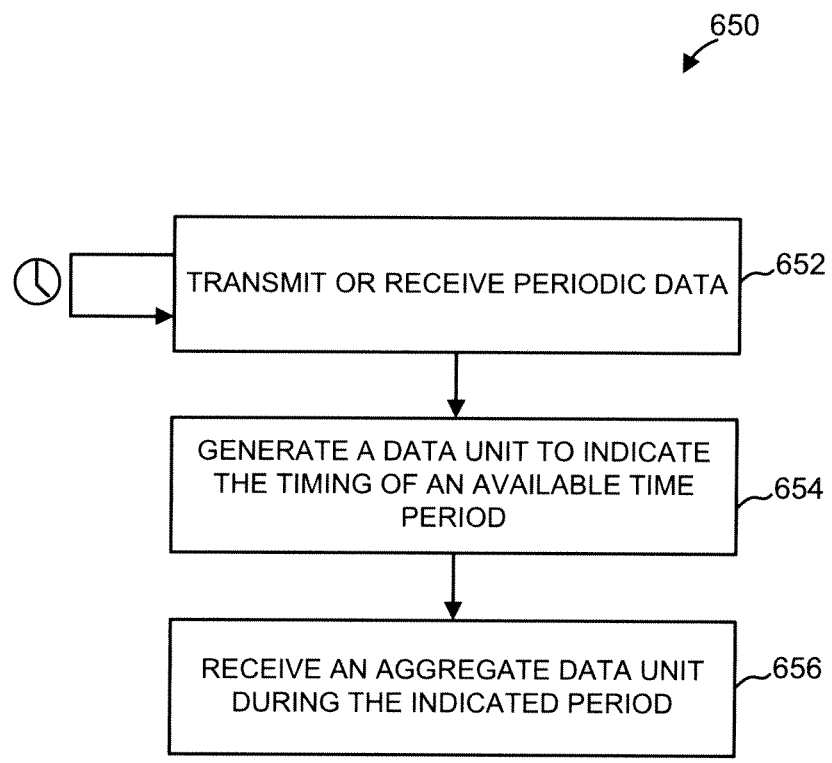
FIG. 13 is a flow diagram of an example method for concurrently communicating periodic data and an aggregate data unit, in an embodiment.

Next, an example method 650 for receiving periodic data and aggregate data concurrently (e.g., using interleaving) is discussed with reference to FIG. 13. In an example embodiment, the method 650 is implemented in the periodic transmission controller 412 and the aggregate data unit timing controller 404.

At block 652, periodic data is transmitted or received using an appropriate communication protocol such as the Bluetooth protocol, for example. In some cases, upon transmitting or receiving data during a corresponding timeslot (e.g., a SCO), the method 650 returns to block 652 after the regular interval that separates adjacent SCOs or similar timeslots. However, if the device executing the method 650 becomes aware that aggregate data is available to be transmitted to the device, a data unit such as a trigger frame is generated at block 654 specifying one or several parameters such as a timing of the time period available for receiving aggregate data. For example, the trigger frame specifies the time interval between the end of the most recent SCO and the scheduled start of the next SCO, in an embodiment. In another embodiment, trigger frame specifies a portion of this available time interval, and the device sleeps during the remainder of the interval. At block 656, the AMPDU or another suitable type of an aggregate data unit is received in accordance with the one or several parameters specified at block 654.

In general, it is noted that the power (and other resource) saving techniques of the present disclosure in other embodiments are used in peer-to-peer networks as well as in WLANs. In one such embodiment, for example, a pair of stations transmit aggregate data to each other using the technique of FIG. 6.

At least some of the various blocks, operations, and techniques described above may be implemented utilizing hardware, a processor executing firmware instructions, a processor executing software instructions, or any combination thereof When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method in a communication network, the method comprising:
negotiating a duration of time during which a communication device can receive an aggregate data unit using an add traffic stream (ADDTS) communication frame;
receiving, from the communication device during a Power Save Poll (PS-Poll) mode, a trigger frame that includes i) a request to transmit the aggregate data unit to the communication device during the PS-Poll mode, and ii) an indication of the duration of time during which the communication device can receive the aggregate data unit;
in response to receiving the trigger frame, generating an aggregate data unit for transmission to the communication device, wherein:
the aggregate data unit includes a plurality of component data units, each having a respective media access channel (MAC) header, and
the aggregate data unit is generated in accordance with the duration of time; and
in response to receiving the trigger frame, transmitting, during the PS-Poll mode, the aggregate data unit to the communication device.

2. The method of claim 1, wherein: the plurality of component data units is a plurality of MAC protocol data units (MPDUs), and the aggregate data unit is an aggregate MPDU (AMPDU).

3. The method of claim 1, wherein: the plurality of component data units is a plurality of MAC service data units (MSDUs), and the aggregate data unit is an aggregate MSDU (AMSDU).

4. The method of claim 1, wherein the duration of time corresponds to a maximum duration of a burst within a service period (SP).

5. The method of claim 4, wherein the trigger frame includes n bits to indicate the maximum duration of the burst in multiples of x μs.

6. The method of claim 1, wherein the duration of time is based on a physical layer (PHY) data rate of a communication channel used to transmit the aggregate data unit to the communication device.

7. The method of claim 1, further comprising receiving an acknowledgement data unit that indicates which of the plurality of component data units have been successfully received at the communication device.

8. The method of claim 7, wherein the aggregate data unit is a first aggregate data unit; the method further comprising:
generating a second aggregate data unit that (i) includes those of the plurality of component data units that have not been successfully received at the communication device and (ii) does not include those of the plurality of component data units that have been successfully received at the communication device.

9. The method of claim 7, wherein: the acknowledgement data unit includes a bitmask, and each bit in the bitmask indicates whether a respective one of the plurality of component data units has been successfully received at the communication device.

10. The method of claim 1, wherein generating the aggregate data unit includes generating exactly one aggregate data unit in response to receiving the data unit.

11. An apparatus comprising:
a trigger frame processor to receive a trigger frame from a communication device during a Power Save Poll (PS-Poll) mode, wherein the trigger frame includes a request to transmit an aggregate data unit to the communication device during the PS-Poll mode;
an aggregate data unit transmit controller configured to
determine, from the trigger frame received from the communication device, a duration of time during which the communication device can receive an aggregate data unit, and
separately negotiate the duration of time with the communication device using an add traffic stream (AD-DTS) communication frame; and
an aggregate data unit generator to generate the aggregate data unit in accordance with the determined duration of time, wherein the aggregate data unit includes a plurality of component data units, each of the plurality of component data units having a respective media access channel (MAC) header,
wherein the aggregate data unit transmit controller transmits, during the PS-Poll mode, the aggregate data unit to the communication device responsive to the trigger frame.

12. The apparatus of claim 11, wherein: the plurality of component data units is a plurality of MAC protocol data units (MPDUs), and the aggregate data unit is an aggregate MPDU (AMPDU).

13. The apparatus of claim 11, wherein the duration of time is based on a physical layer (PHY) data rate of a communication channel used to transmit the aggregate data unit to the communication device.

14. The apparatus of claim 11, further comprising an acknowledgement (ACK) processor to process an acknowledgement data unit that indicates which of the plurality of component data units have been successfully received at the communication device.

15. A method in a first communication device, the method comprising:
negotiating, using an add traffic stream (ADDTS) communication frame, a parameter with a second communication device during a Power Save Poll (PS-Poll) mode, wherein the parameter indicates a maximum duration of a time interval during which the first communication device can receive aggregated data from the second communication device during the PS-Poll mode;
sending a trigger frame to the second communication device to prompt the second communication device to transmit an aggregate data unit to the first communication device during the PS-Poll mode, wherein the trigger frame includes the parameter; and
receiving, during the PS-Poll mode, the aggregate data unit from the second communication device responsive to the trigger frame, wherein:
the aggregate data unit includes a plurality of component data units, each having a respective media access channel (MAC) header, and
the aggregate data unit is received within the time interval.

16. The method of claim 15, wherein negotiating the parameter includes generating the trigger frame, and sending the trigger frame.

17. The method of claim 15, further comprising:
determining a duration of a sleep time interval during which the first communication device does not receive aggregated data; and
powering down at least one component of the first communication device for the duration of the sleep time interval.

18. The method of claim 15, further comprising generating an acknowledgement in response to receiving the aggregate data unit, wherein the acknowledgement indicates which of the plurality of component data units have been successfully received.

19. The method of claim 18, wherein the aggregate data unit is a first data unit; the method further comprising:
sending the acknowledgement to the second communication device; and receiving a second aggregate data unit responsive to sending the acknowledgement, wherein the second aggregate data unit (i) includes those of the plurality of component data units that have not been successfully received at the first communication device and (ii) does not include those of the plurality of component data units that have been successfully received at the first communication device.

20. The method of claim 15, further comprising negotiating the parameter for each stream available for receiving aggregated data from the second communication device.

21. The method of claim 15, wherein:
the first communication device is a station that operates in a wireless local area network (WLAN), and the second communication device is an access point (AP) that operates in the WLAN.

22. The method of claim 15, wherein:
the plurality of component data units is a plurality of MAC protocol data units (MPDUs), and the aggregate data unit is an aggregate MPDU (AMPDU).

23. The method of claim 15, further comprising:
receiving periodic data from a third communication device during regularly scheduled timeslots; and
determining the maximum duration of the time interval in view of the regularly scheduled timeslots.

24. The method of claim 23, wherein:
receiving the aggregate data unit from the second communication device includes utilizing a first communication protocol, and
receiving the periodic data from the third communication device includes utilizing a second communication protocol.

25. The method of claim 24, wherein the second communication protocol is the Bluetooth communication protocol.

26. The method of claim 23, further comprising: generating a trigger data unit that indicates the parameter;

wherein the aggregate data unit is received between two consecutive timeslots of the regularly scheduled timeslots in response to sending the trigger frame.

27. The method of claim 15, wherein a duration of the aggregate data unit is shorter than a duration of at least one of a (i) a service period (SP) or (ii) a transmission opportunity (TxOP) during which the aggregate data unit is transmitted.

28. An apparatus for use in a first communication device, the apparatus comprising:
    an aggregate data unit timing controller to negotiate, during a Power Save Poll (PS-Poll) mode using an add traffic stream (ADDTS) communication frame, a parameter with a second communication device, wherein the parameter indicates a maximum duration of a time interval during which the first communication device can receive aggregated data from the second communication device during the PS-Poll mode; and
    an aggregate data unit processor to:
    send, during the PS-Poll mode, a trigger frame to the second communication device to prompt the second communication device to transmit an aggregate data unit to the first communication device, wherein the trigger frame includes the parameter, and
    receive the aggregate data unit from the second communication device during the PS-Poll mode responsive to the trigger frame, wherein:
        the aggregate data unit includes a plurality of component data units, each having a respective media access channel (MAC) header, and
        the aggregate data unit is received within the time interval.

29. The apparatus of claim 28, further comprising: a trigger frame generator to generate a trigger data unit that indicates the parameter, wherein the aggregate data unit processor sends the trigger data unit to the second communication device.

30. The apparatus of claim 28, further comprising: an acknowledgement generator to generate an acknowledgement in response to receiving the aggregate data unit, wherein the acknowledgement indicates which of the plurality of component data units have been successfully received.

31. The apparatus of claim 28, further comprising: a sleep controller to (i) determine a duration of a sleep time interval during which the first communication device does not receive aggregated data, and (ii) power down at least one component of the first communication device for the duration of the sleep time interval.

32. The apparatus of claim 28, further comprising: a periodic transmission controller to (i) receive periodic data from a third communication device during regularly scheduled timeslots, and (ii) determine the maximum duration of the time interval in view of a duration of the regularly scheduled timeslots.

* * * * *